(12) United States Patent
Luebeck et al.

(10) Patent No.: US 11,199,889 B2
(45) Date of Patent: Dec. 14, 2021

(54) BEZEL INTERFACE PROVIDING BACKUP POWER TO RELAY CONTROL CIRCUITRY

(71) Applicant: CARRIER CORPORATION, Palm Beach Gardens, FL (US)

(72) Inventors: Jon Marc Luebeck, Stayton, OR (US); Dean Sinn, Palm Beach Gardens, FL (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/776,588

(22) Filed: Jan. 30, 2020

(65) Prior Publication Data

US 2020/0264680 A1 Aug. 20, 2020

Related U.S. Application Data

(60) Provisional application No. 62/806,167, filed on Feb. 15, 2019.

(51) Int. Cl.
| | |
|---|---|
| *G06F 1/26* | (2006.01) |
| *G07C 9/00* | (2020.01) |
| *H04W 4/80* | (2018.01) |

(52) U.S. Cl.
CPC ......... *G06F 1/263* (2013.01); *G07C 9/00174* (2013.01); *H04W 4/80* (2018.02); *G07C 2009/00642* (2013.01); *H04M 2250/02* (2013.01)

(58) Field of Classification Search
None
See application file for complete search history.

(56) References Cited

U.S. PATENT DOCUMENTS

| 4,972,182 | A | * | 11/1990 | Novik | G07C 9/00182 |
|---|---|---|---|---|---|
| | | | | | 340/5.25 |
| 5,694,335 | A | | 12/1997 | Hollenberg | |
| 5,823,027 | A | | 10/1998 | Click et al. | |
| 8,035,477 | B2 | | 10/2011 | Kirkjan | |
| 8,772,970 | B2 | | 7/2014 | Lambrou | |
| 9,728,017 | B2 | * | 8/2017 | Paquin | G07C 9/00174 |
| 9,852,562 | B2 | | 12/2017 | Belhadia et al. | |
| 9,963,921 | B1 | | 5/2018 | Kamkar et al. | |
| 10,013,825 | B2 | | 7/2018 | Belhadia et al. | |
| 2007/0176775 | A1 | * | 8/2007 | White | E05B 45/06 |
| | | | | | 340/542 |
| 2013/0213100 | A1 | | 8/2013 | Cohen | |
| 2016/0260271 | A1 | * | 9/2016 | Belhadia | G06F 21/35 |
| 2018/0040183 | A1 | * | 2/2018 | Cheng | G07C 9/00309 |

(Continued)

FOREIGN PATENT DOCUMENTS

| CN | 2459408 | 11/2001 |
|---|---|---|
| CN | 205206509 | 5/2016 |

(Continued)

*Primary Examiner* — Carlos Garcia
(74) *Attorney, Agent, or Firm* — Carlson, Gaskey & Olds, P.C.

(57) ABSTRACT

An access control system includes a controller having a credential analyzer, a lock controlled by the controller, and a bezel. The bezel has a power jack electrically connected to the credential analyzer and lock such that the credential analyzer and lock can be operatively powered by an external power source through the power jack.

16 Claims, 10 Drawing Sheets

(56) References Cited

U.S. PATENT DOCUMENTS

2018/0068511 A1  3/2018 Hsu
2019/0234113 A1* 8/2019 Neau ................... E05B 17/002

FOREIGN PATENT DOCUMENTS

| CN | 106437318    | 2/2017  |
|----|--------------|---------|
| CN | 108316777    | 7/2018  |
| CN | 2008040063 U | 11/2018 |
| FR | 2732999      | 10/1996 |
| KR | 20050074820  | 7/2005  |
| WO | 2013170292   | 11/2013 |

* cited by examiner

BEZEL INTERFACE PROVIDING BACKUP POWER TO RELAY CONTROL CIRCUITRY

CROSS-REFERENCE TO RELATED APPLICATIONS

This application claims priority to U.S. Provisional Application No. 62/806,167, which was filed on Feb. 15, 2019 and is incorporated herein by reference.

BACKGROUND

Access control systems detect whether credentials authorized to enter a facility are present and selectively allow entry to the facility based on the presence or absence of the credentials. For example, an access control system, upon detecting authorized credentials, may unlock a door. Such access control systems commonly rely on the facility's power to function. A power outage may render a secured area inaccessible to authorized personnel, since an access control system without power may be unable to detect authorized credentials or unlock a lock.

SUMMARY OF THE INVENTION

In one exemplary embodiment, an access control system includes a controller having a credential analyzer, a lock controlled by the controller, and a bezel. The bezel has a power jack electrically connected to the credential analyzer and lock such that the credential analyzer and lock can be operatively powered by an external power source through the power jack.

In another example, the above described system is configured for installation in a cellular tower cabinet.

In another example of any of the above described, the credential analyzer and lock can operate on 9 volt to 12 volt power.

In another example of any of the above described, the external power source is a 9 volt battery.

In another example of any of the above described, the bezel comprises a button for activating the credential analyzer.

In another example of any of the above described, the credential subsystem includes a bezel and a button and configured to operate for a predetermined amount of time after the button is pressed.

In another example of any of the above described, the credential analyzer wirelessly checks for authorized credentials within an area nearby.

In another example of any of the above described, the credential analyzer checks for authorized credentials using a Bluetooth protocol.

In another example of any of the above described the credential analyzer checks for authorized credentials by attempting to establish communication with nearby smart devices within the area and query the smart devices for authorized credentials.

In another example of any of the above described, the credential analyzer unlocks the lock upon detecting authorized credentials.

In another example of any of the above described, the bezel includes a relay board having a solid state integrated circuit. The controller controls the lock by putting the integrated circuit in either a high voltage or low voltage state. The lock is configured to unlock and remain unlocked if and only if the integrated circuit is in the high voltage state.

In another exemplary embodiment, a cellular tower cabinet includes an access control system configured to be operatively powered an external power source in an absence of facility power. A bezel includes a power jack electrically connected to the access control system.

In another example of any of the above described, the access control system is configured to be operatively powered by facility power in the absence of a power outage.

In another example of any of the above described, the access control system includes a solid state integrated circuit and a lock. The lock is configured to unlock and remain unlocked if and only if the integrated circuit is in a high voltage state.

In another example of any of the above described, the bezel includes a button for activating the access control system.

In another example of any of the above described, the access control system is configured to analyze smart devices for credentials.

In another example of any of the above described, the bezel includes a plug for the power jack.

An exemplary method for accessing a facility includes, accessing a bezel on an exterior of the facility and powering an access control system by connecting an external power source to the bezel. The method further includes activating an access control system by pushing button on the bezel.

In another example of any of the above described method, accessing the bezel includes removing a weather guard from the bezel.

In another example of any of the above described methods, the facility is a cellular tower cabinet.

These and other features of the present invention can be best understood from the following specification and drawings, the following of which is a brief description.

DETAILED DESCRIPTION

Figure 1:
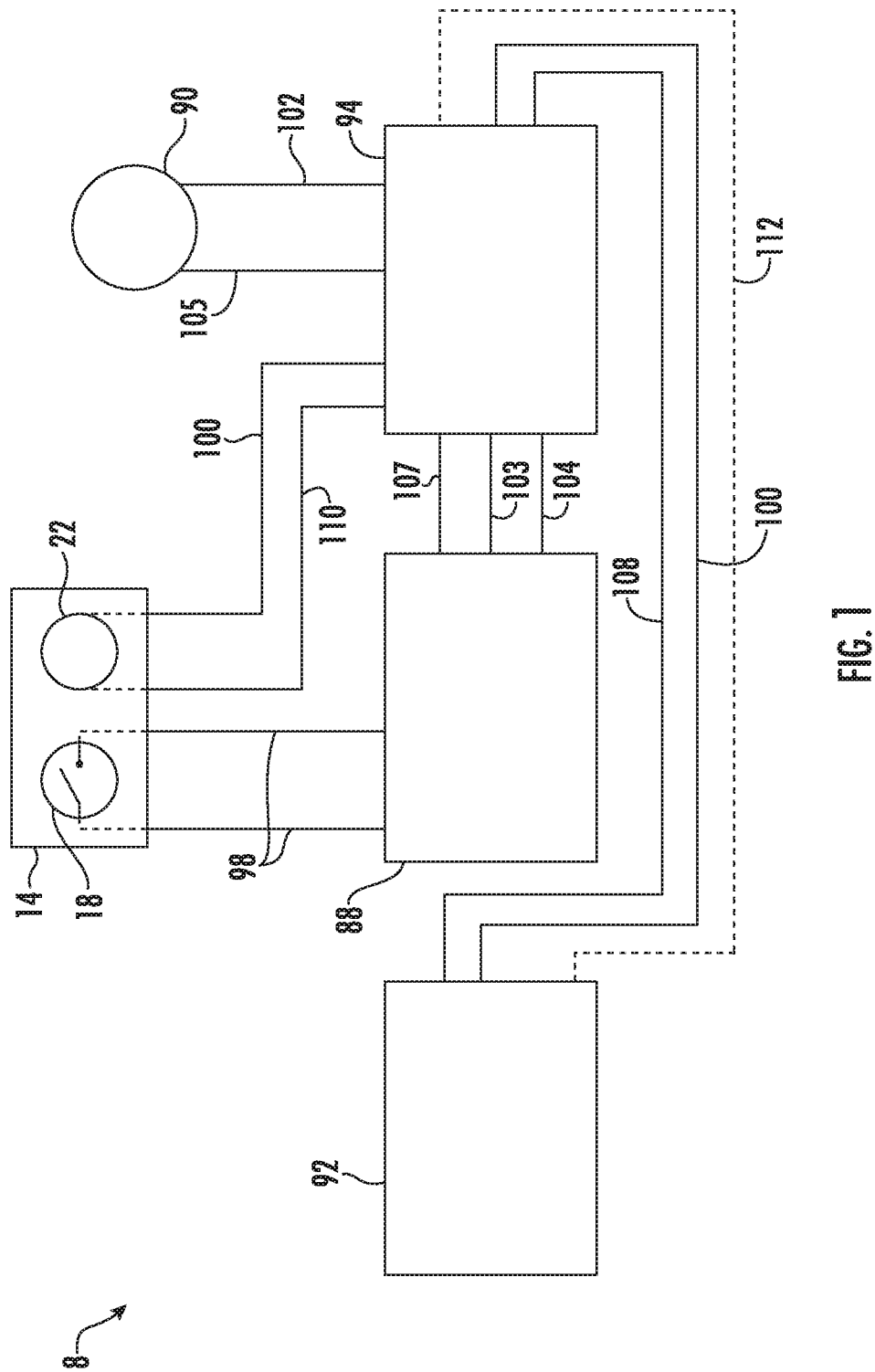
FIG. 1 schematically illustrates an access control system.

FIG. 1 schematically illustrates an access control system 8. A bezel 14 includes a power button 18 and a power jack 22. The power button 18 completes an activation circuit 98 connected to a controller 88. According to some embodiments, the controller 88 is a known electronic controller, such as controllers currently marketed as "Trac-Mini." The controller 88 and bezel 14 are also connected to a relay board 94. The relay board 94 is configured to operate a lock 92 with power from either facility power 90 or the power jack 22.

The power jack 22 is connected to the relay board 94 through a positive line 110 and a ground line 100. The facility power 90 is connected to the relay board 94 by first and second inputs 102, 105. According to some embodiments, the facility power supply is 48 volts. The controller 88 is connected to the relay board 94 through a reset line 103, a ground line 104, and a set line 107. The controller 88 and relay board 94 are respectively configured such that a pulse sent across the set line 107 will unlock the lock 92, and a pulse sent across the reset line 103 will lock the lock 92. To that end, the relay board 94 is connected to the lock 92 through a lock signal line 108 for sending activation signals to the lock 92, and a ground line 100. According to some embodiments, the relay board 94 is also connected to the lock 92 by a constant power line 112, as may be necessary for certain applications or locks.

The controller 88, relay 94, and lock 92 are thus electrically connected to the power jack 22 such that the access control system 8 can be operatively powered by an external power source 84 through the power jack 22. In other words, the controller 88 and lock 92 can function as intended when powered only by the power source 84 through the power jack 22.

The access control system 8 operates on facility power 90 when available, but can be operatively powered by the external power source 84 through the power jack 22 in the absence of facility power 90. The controller operates for a predetermined length of time following a button 18 press when powered by the external power source 84. In some embodiments, the predetermined length of time is 30 seconds.

Figure 2:
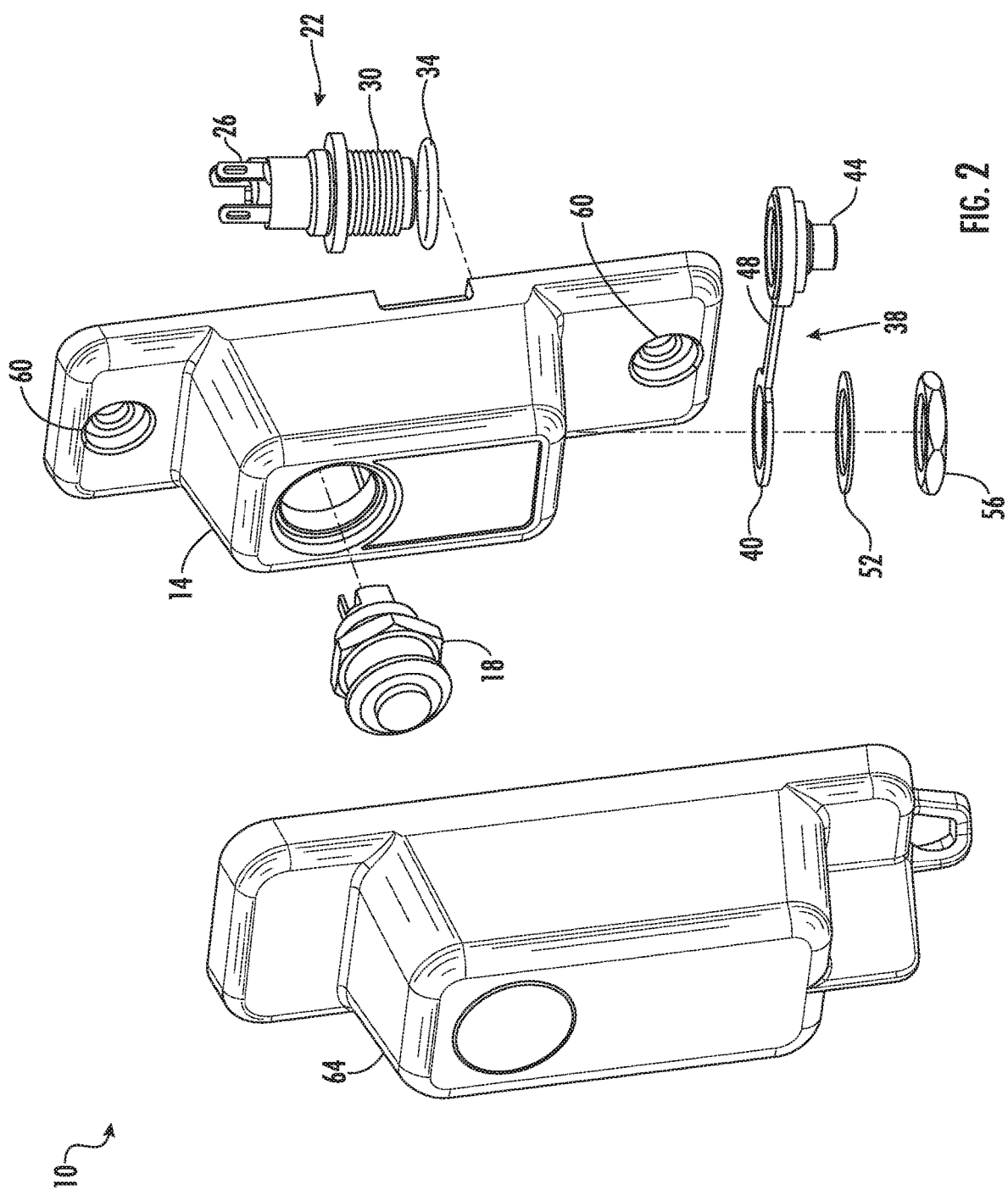
FIG. 2 is an exploded view of an access control system bezel assembly.

FIG. 2 illustrates a bezel assembly 10 for an access control system 8 that controls access to a secured area. According to some embodiments, the secured area is a cellular tower cabinet, and in others the secured area is a room or a building.

The bezel assembly 10 includes the bezel 14, power button 18, power jack 22, and a cap 38. The power jack 22 includes prongs 26 and a threaded portion 30. The power jack 22 is provided with a seal ring 34 that is received over and encircles a section of the threaded portion 30 to provide a seal at the interface between the interior of the bezel 14 and the threaded portion 30.

The cap 38 includes a cap ring 40 to loop over a section of the threaded portion 30 that extends out of the bezel 14. The cap 38 further includes a plug 44 that is partially received in an opening in one end of the threaded portion 30. A flexible bridge 48 connects the plug 44 to the cap ring 40. A washer 52 and nut 56 secure the cap ring 40 against the bezel 14.

The bezel 14 includes fastener holes 60 to fasten the bezel to a surface. The bezel assembly 10 includes a cover 64 to protect the bezel 14 from tampering and weather. In the illustrated embodiment, the cover 64 snaps over the bezel 14 with a close fit. According to further embodiments, the cover 64 can be fastened or locked over the bezel 14.

Figure 3:
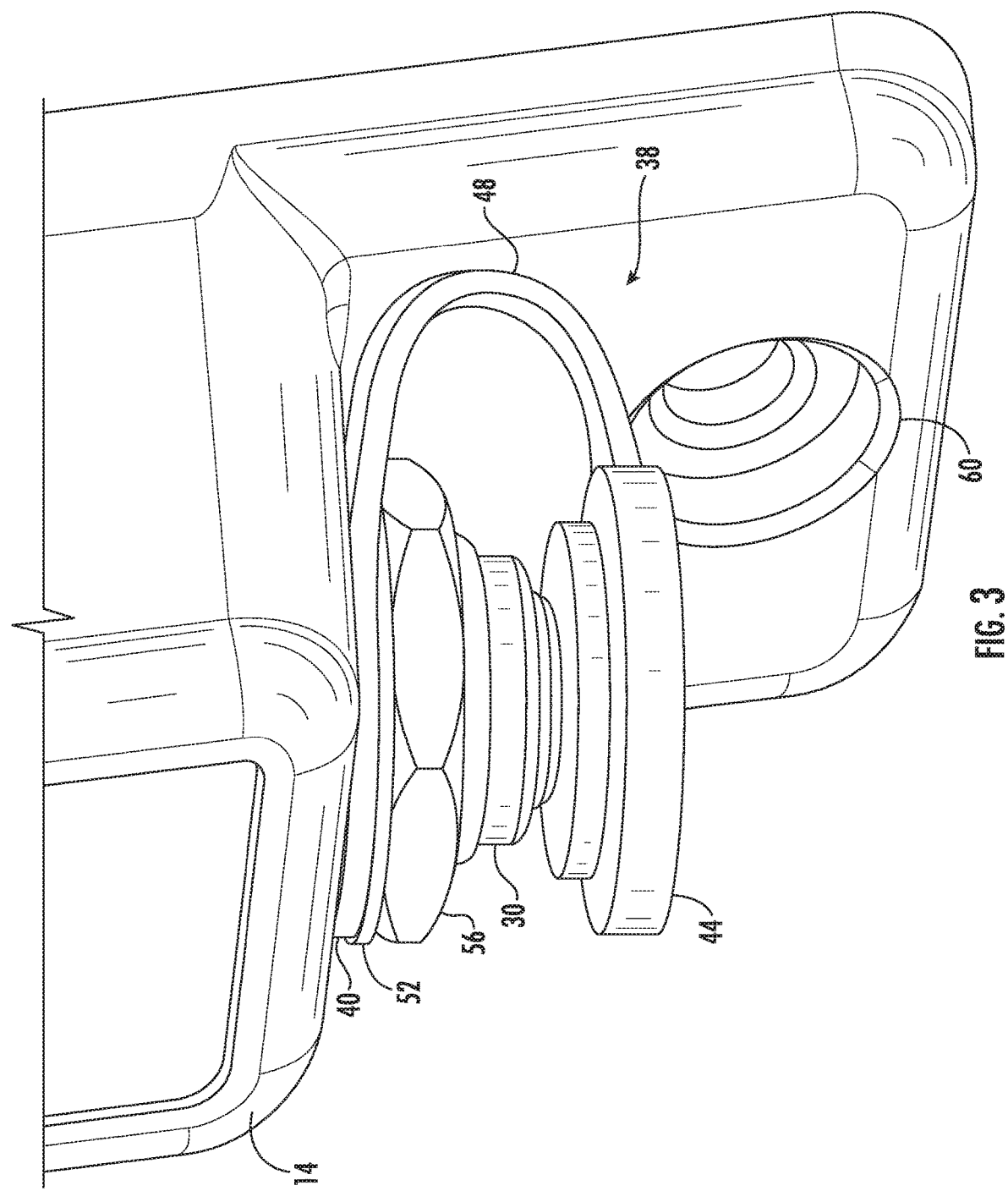
FIG. 3 is a close view of the bezel.

FIG. 3 shows selected features of the bezel assembly 10 in an installed or assembled condition. The power jack 22 is disposed within the bezel 14 except for the threaded portion 30, which extends out of the bezel 14. The cap ring 40 and washer are stacked and received over the threaded portion 30 and fastened in place by the nut 56, which is threaded on the threaded portion 30. The cap 38 is thereby fastened to an exterior surface of the bezel 14 and the power jack 22 is held securely within an interior surface of the bezel 14.

Figure 4:
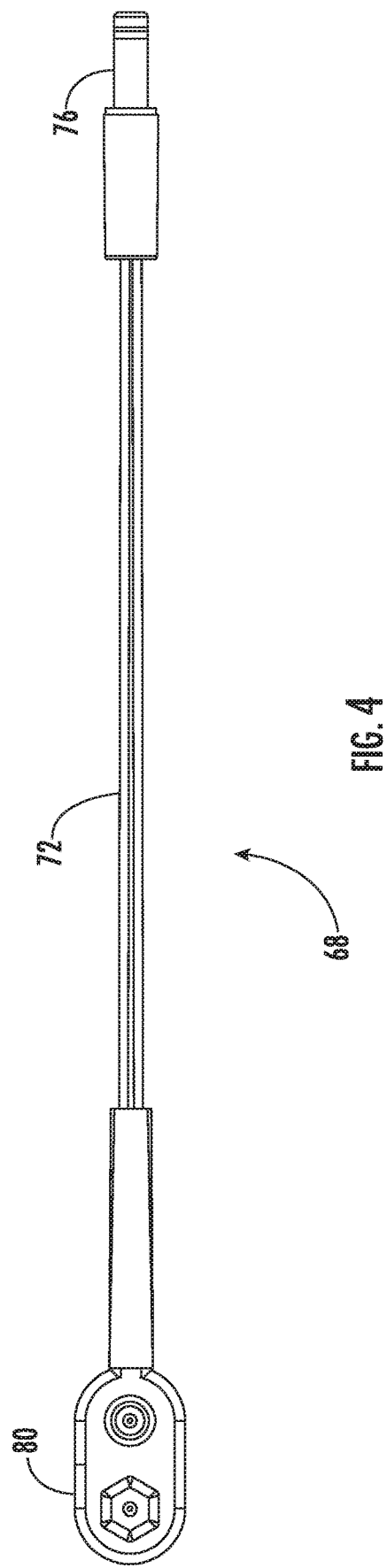
FIG. 4 illustrates a power cable.

An exemplary power cable 68 is illustrated in FIG. 4. The power cable 68 includes a cable portion 72 electrically connecting a bezel adapter 76 and a source adapter 80. The bezel adapter 76 is configured to establish and electrically conductive connection with the power jack 22. The source adapter 80 is configured for connecting to an external power source, such as a battery. The adapters 76, 80 of the illustrated embodiment are merely exemplary, and other adapters are contemplated. For example, the bezel adapter 76 of the illustrated embodiment is a barrel adapter, but other adapters could be suitable depending on the application.

Figure 5:
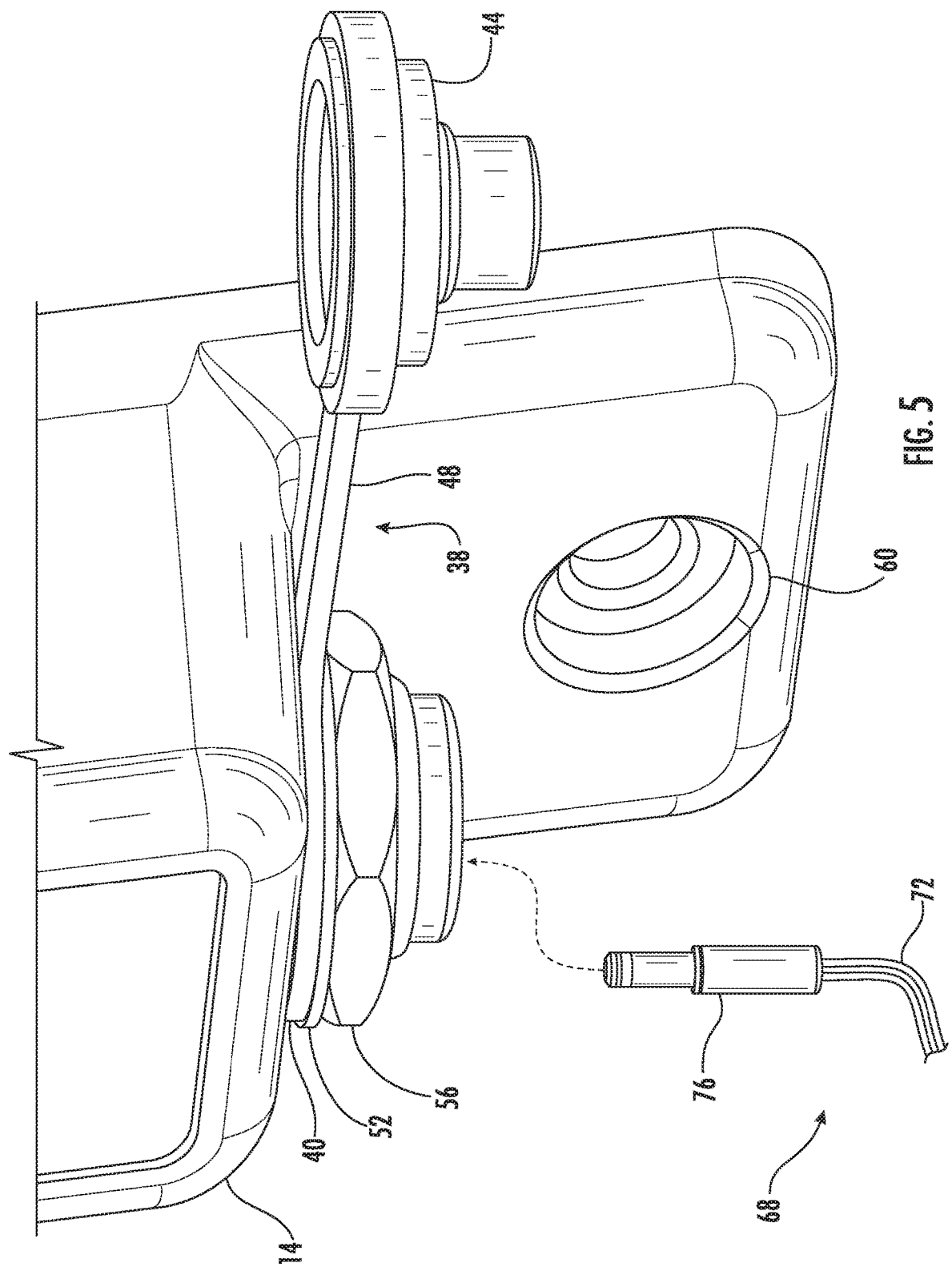
FIG. 5 is a second close view of the bezel.
Figure 6:
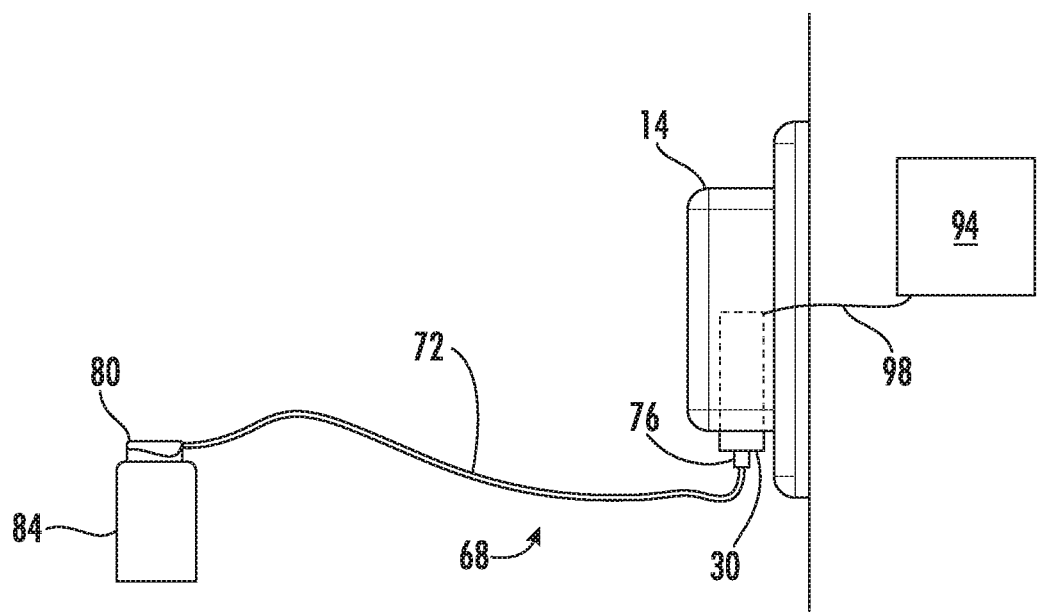
FIG. 6 illustrates the bezel connected to an external power source.

Turning to FIG. 5, removing the plug 44 from the threaded portion 30 of the power jack 22 exposes the opening in the threaded portion 30, which allows the bezel adapter 76 to be operatively inserted into the threaded portion 30. Referring to FIG. 6, the source adapter 80 is connected to the external power source 84 and the bezel adapter 76 is inserted into the threaded portion 30. The power cable 68 thereby electrically connects the power source 84 to the power jack 22. According to some embodiments, the power source 84 is a 9 volt alkaline battery. According to further embodiments, the power source is a battery of a different size or type, a power generator, a fuel cell, or any other suitable power source.

Figure 7A:
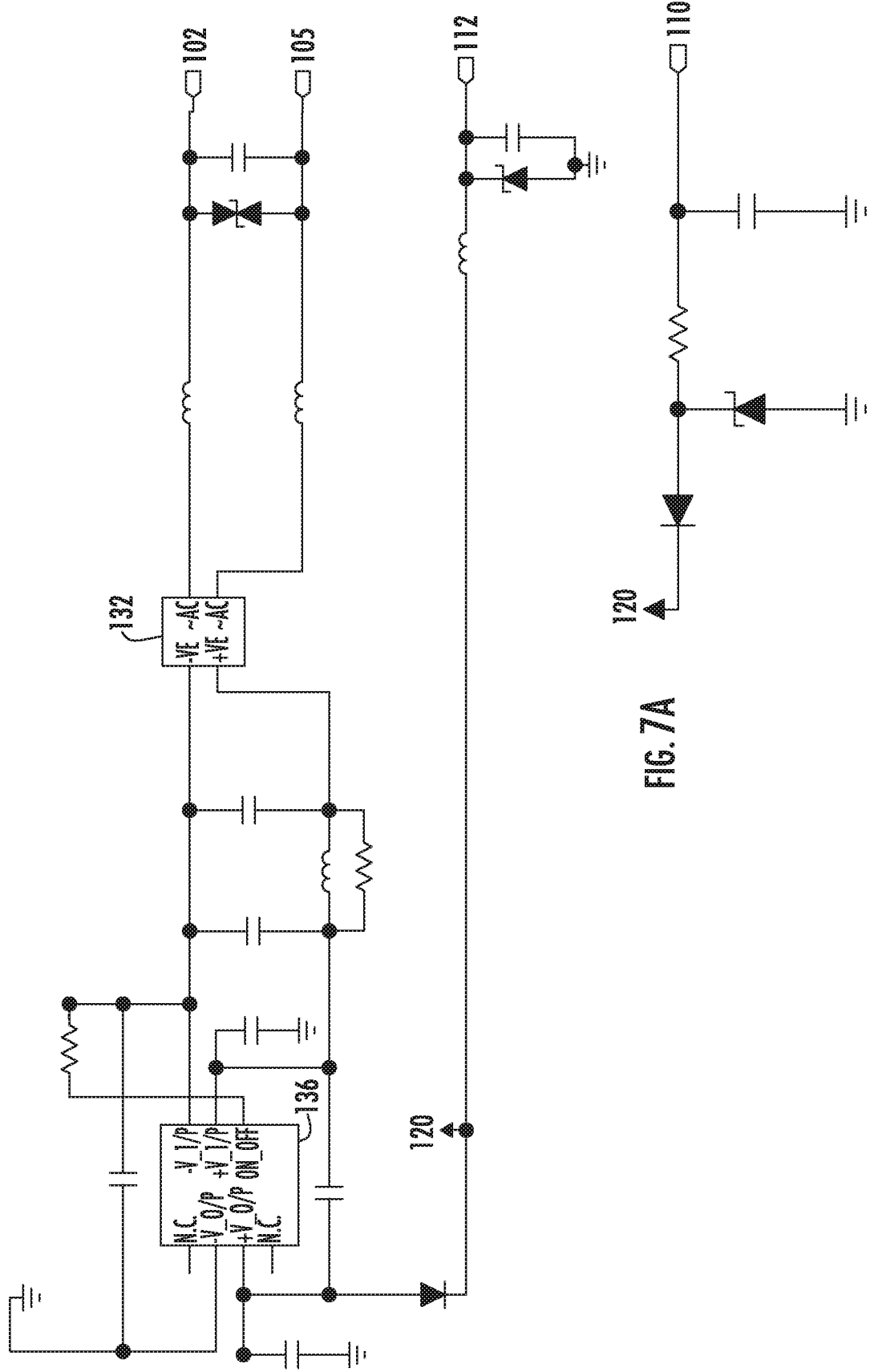
FIG. 7A schematically illustrates a first part of a circuit on a relay board.
Figure 7B:
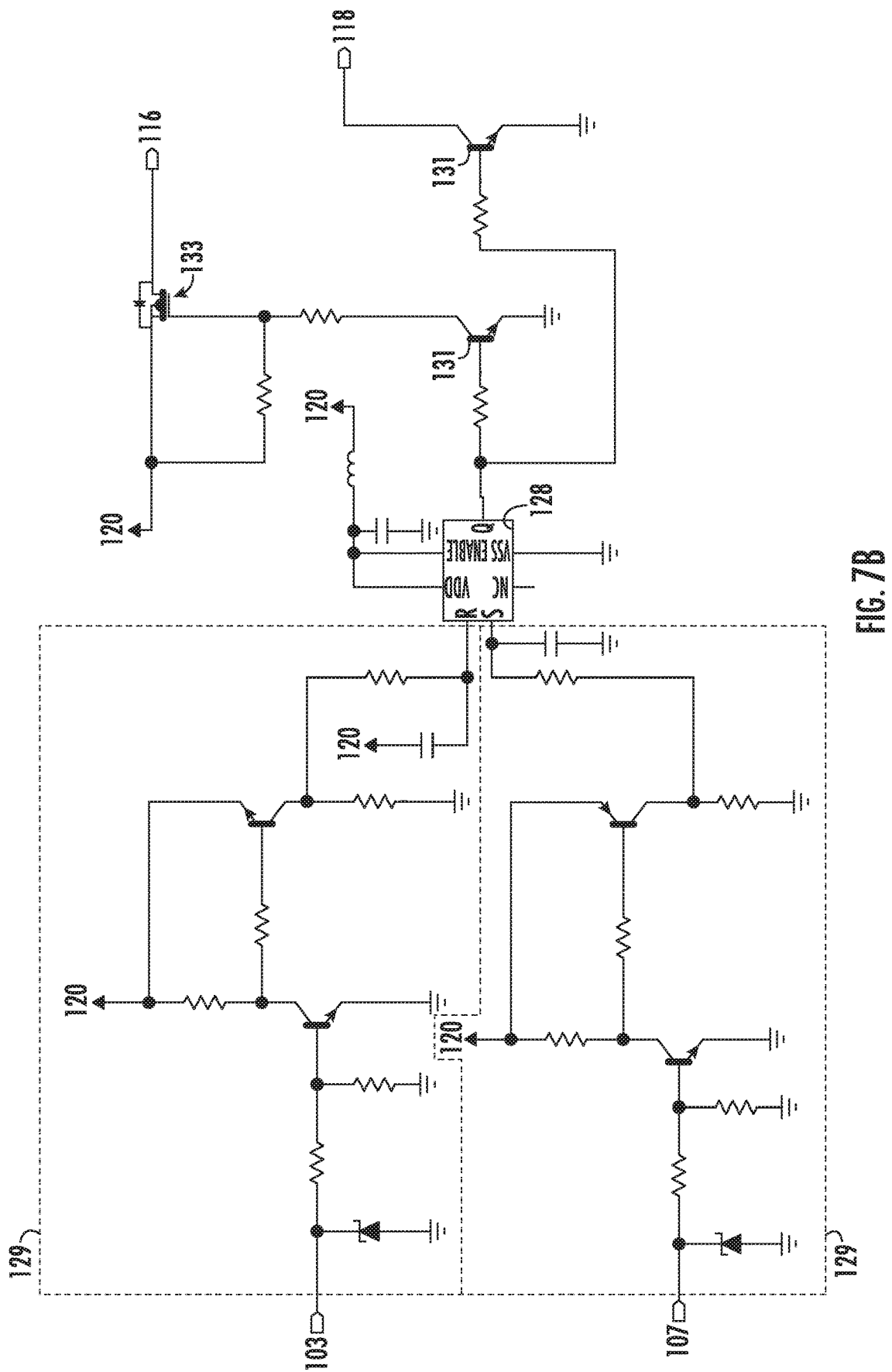
FIG. 7B schematically illustrates a second part of the circuit on the relay board.
Figure 7C:
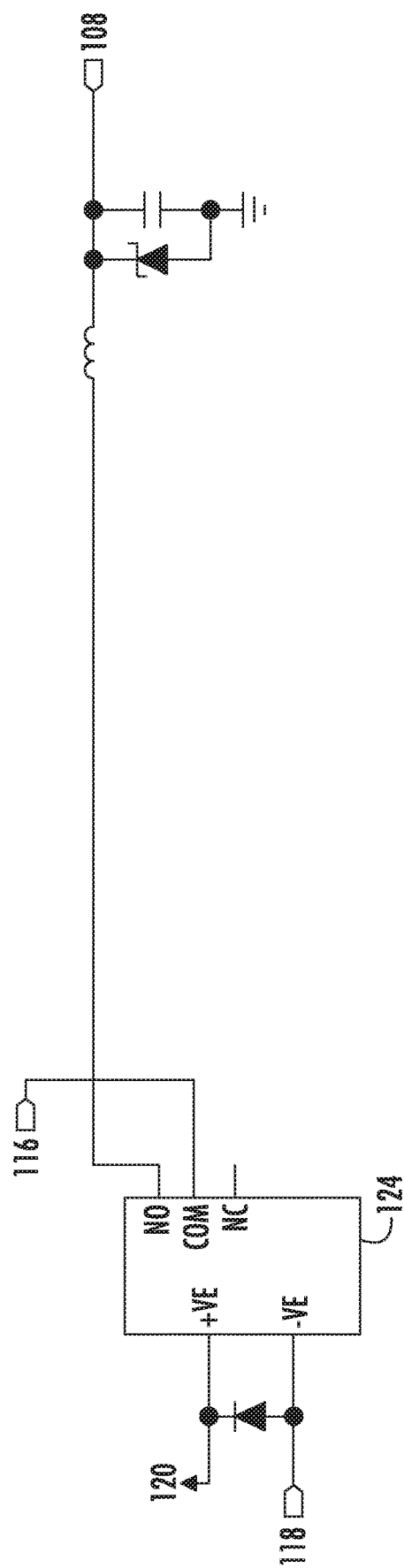
FIG. 7C schematically illustrates a third part of the circuit on the relay board.

FIGS. 7A-7C schematically represent a circuit configuration on the relay board 78. The configuration enables the access control system 8 to operate on facility power 90 or power from the external power source 84. The relay board 94 includes a power node 120 connected to facility power 90 and the bezel's 14 power jack 22 as shown in FIG. 7A. The first and second inputs 102, 105 from the facility power 90 connect to a rectifier 132. Direct current from the rectifier 132 is converted to an appropriate voltage by a converter 136, which is in turn connected to the power node 120. According to some embodiments, the converter 136 converts 48 volt facility power 90 to 12 volt power. According to further embodiments, the access control system 8, including the controller 88, relay board 94, and lock 92, operates on 9 volt to 12 volt power. For example, when facility power is available, the access control system 8 operates on 12 volt power, but can function as intended on at least as low as 9 volt power. The power node 120 is also connected to the positive line 110 extending from the power jack 22. Diodes on either side of the power node 120 prevent the external power source 84 from interfering with facility power 90.

As shown in FIG. 7B, the current on an output line 116 and control line 118 both depend on the inputs from the reset line 103 and set line 107 to a known set-reset "flip flop" integrated circuit 128. The integrated circuit 128 is powered by the power node 128. The integrated circuit 128 is configured such that a pulse of voltage at a reset pin R puts an output pin Q in a low voltage state, and a pulse of voltage at a set pin 107 puts the output pin Q in a high voltage state. The reset line 103 and set line 107 are respectively linked to the reset pin R and set pin S on the integrated circuit 128 such that a pulse of voltage across reset or set line 103, 107 will result in a corresponding pulse at a respective one of the reset pin R or set pin S. Thus, the output pin Q will remain in a high voltage state or a low voltage state depending on which of the set line 107 or reset line 103, respectively, was pulsed more recently, assuming the relay board 88 is receiving power.

In the illustrated embodiment, the reset line 103 and set line 107 are respectively connected to the reset pin R and set pin S across signal conditioners 129. The signal conditioners 129 are configured such that a pulse across the reset line 103 or set line 107 will connect the power node 120 to the respective one of the reset pin R or set pin S. In this way, the controller 88 can output signals at a different voltage than an operating voltage of the integrated circuit 128.

According to some embodiments, the integrated circuit 128 is a silicon solid state chip. Use of a solid state chip in the relay board 94 prevents certain methods of tampering with the lock. For example, the solid state integrated circuit 128 has no moving parts, and therefore cannot be manipulated from outside the secured area by using a magnet.

When the integrated circuit 128 is in a reset, or low voltage state, relay transistors 131 act as open contacts. When the integrated circuit is in a set, or high voltage state, the relay transistors 131 act as closed contacts, thereby connecting the control line 118 and a "PFET" MOSFET 133 to ground. The connection to ground puts the MOSFET 133 in a high potential state wherein it acts as a closed contact connecting the power node 120 to the output line 116. A pulse across the set line 107 therefore puts the output pin Q of the integrated circuit 128 in a high voltage state and results in the power node 120 being connected to both the output line 116 and control line 118.

Turning to FIG. 7C, a relay switch 124 operates to selectively connect the output line 116 to the lock signal line 108 depending on the state of the integrated circuit 128. When the integrated circuit 128 is in the high voltage state, the control line 118 will be connected to ground as explained above. Therefore, the integrated circuit 128 being in the high voltage state will connect a negative pin −VE of the relay switch 124 to ground. With the negative pin −VE connected to ground and a positive pin +VE connected to the power node, the relay switch 124 will connect its common pin COM to its normally open pin NO. As shown, connecting the common pin COM to the normally open pin NO connects the output line 116, which is connected to the power node 120 as explained above, to the lock signal line 108. Putting the integrated circuit 128 in the high voltage, or "set" state, therefore connects the power node 120 to the lock signal line 108. The presence of the relay switch 124 limits the number of unintended circumstances wherein the output line 116 is connected to the lock signal line 108, thereby extending the life of the MOSFET 133 and other relatively low-durability components.

Figure 8:
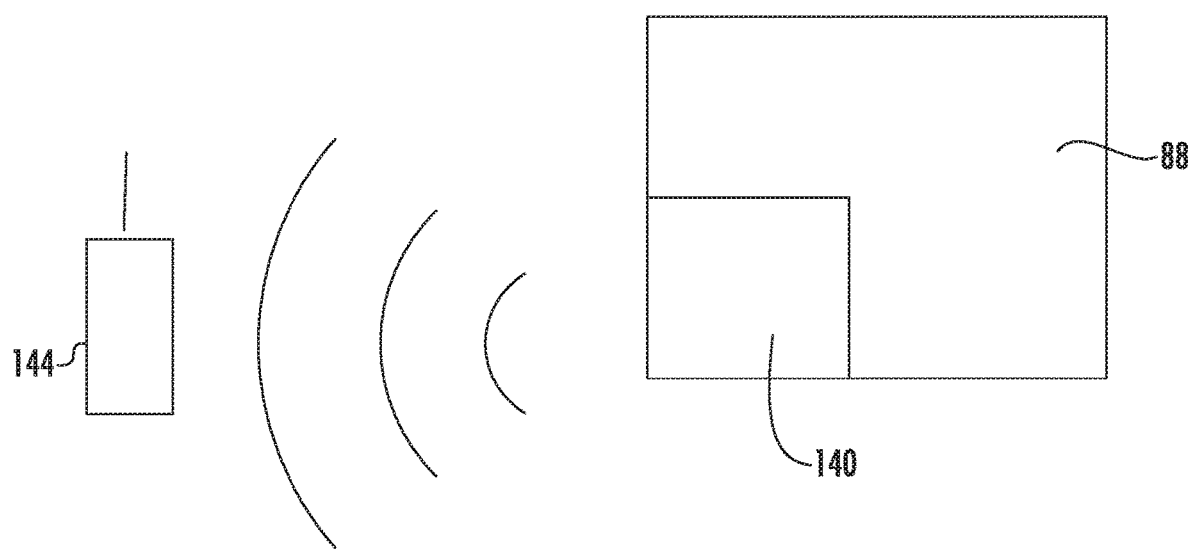
FIG. 8 illustrates a controller communicating with a portable electronic device.

Turning to FIG. 8, the controller 88 includes a credential analyzer 140 which may be any of a variety of systems or protocols for checking an identity of a user or the presence of a credential. According to some embodiments, the credential analyzer 140 uses Bluetooth to wirelessly check for authorized credentials within an area. In some embodiments, the area is defined by a predetermined range from the controller. In further embodiments, the area is the controller's 88 Bluetooth communication range. The credential analyzer 140 communicates with a portable electronic device 144 that has stored user identifying information, such as a smart device. The credential analyzer 140 attempts to establish communication with the device 144 and query the smart device 144 for authorized credentials. According to further embodiments, the credential analyzer 140 uses one of infrared or near field communication to wirelessly detect the presence of authorized credentials. Upon detecting authorized credentials, the controller 88 signals the relay 94 to unlock the lock 92. After a predetermined amount of time, if authorized credentials are no longer detected, the controller 88 signals the relay 94 to lock the lock 92.

According to some embodiments, the lock 92 is configured to unlock and remain unlocked if and only if there is voltage across the lock signal line 108. The controller 88 signals the relay 94 to unlock the lock 92 by applying voltage across the set line 107, which connects the power node 120 to the lock signal line 108 as explained above. The controller 88 signals the relay 95 to lock the lock 92 by applying voltage across the reset line 103, which disconnects the power node 120 from the lock signal line.

The preceding description is exemplary rather than limiting in nature. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. An access control system comprising:
   a controller having a credential analyzer;
   a lock controlled by the controller;
   a bezel having a power jack electrically connected to the credential analyzer and lock such that the credential analyzer and lock can be operatively powered by an external power source through the power jack, wherein the bezel comprises a button for activating the credential analyzer, and wherein the credential analyzer wirelessly checks for authorized credentials within an area;
   a relay board having a solid state integrated circuit;
   wherein the controller controls the lock by putting the integrated circuit in either a high voltage or low voltage state; and
   wherein the lock is configured to unlock and remain unlocked if and only if the integrated circuit is in the high voltage state.

2. The access control system of claim 1, configured for installation in a cellular tower cabinet.

3. The access control system of claim 1, wherein the credential analyzer is configured to operate for a predetermined amount of time after the button is pressed.

4. The access control system of claim 1, wherein the credential analyzer unlocks the lock upon detecting authorized credentials.

5. The access control system of claim 1, comprising a weather proof cover that is removably secured to the bezel.

6. The access control system of claim 1, wherein the credential analyzer and lock can operate on 9 volt to 12 volt power.

7. The access control system of claim 6, wherein the external power source is a 9 volt battery.

8. The access control system of claim 1, wherein the credential analyzer checks for authorized credentials using a Bluetooth protocol.

9. The access control system of claim 8, wherein the credential analyzer checks for authorized credentials by attempting to establish communication with smart devices within the area and query the smart devices for authorized credentials.

10. A method for accessing a facility comprising:
    accessing a bezel on an exterior of the facility;
    powering an access control system by connecting an external power source to the bezel; and
    activating an access control system by pushing a button on the bezel, wherein the access control system wirelessly checks for authorized credentials within an area for a predetermined amount of time upon pushing the button, herein the access control system comprises a relay board having a solid state integrated circuit and the bezel comprises a lock, wherein the access control system controls the lock by putting the integrated circuit in either a high voltage or low voltage state; and wherein the lock is configured to unlock and remain unlocked if and only if the integrated circuit is in the high voltage state.

11. The method for accessing a facility of claim 10, wherein accessing the bezel includes removing a weather guard from the bezel.

12. The method for accessing a facility of claim 10, wherein the facility is a cellular tower cabinet.

13. A cellular tower cabinet comprising:
   an access control system configured to be operatively powered an external power source in an absence of facility power, and the access control system is configured to be operatively powered by facility power in the presence of facility power;
   a bezel including a power jack electrically connected to the access control system, wherein the bezel includes a button for activating the access control system; and
   a solid state integrated circuit and a lock, the lock configured to unlock and remain unlocked if and only if the integrated circuit is in a high voltage state.

14. The cellular tower cabinet of claim 13, wherein the bezel comprises a plug for the power jack.

15. The cellular tower cabinet of claim 13, wherein the access control system is configured to analyze smart devices for credentials.

16. The cellular tower cabinet of claim 15, wherein the access control system is configured to analyze smart devices wirelessly.

\* \* \* \* \*